United States Patent
Koolen et al.

(10) Patent No.: US 8,664,885 B2
(45) Date of Patent: Mar. 4, 2014

(54) CIRCUIT FOR CONNECTING A LOW CURRENT LIGHTING CIRCUIT TO A DIMMER

(75) Inventors: Gert-Jan Koolen, Aarle Rixtel (NL); Victor Zwanenberg, Boxtel (NL); Jochem Bonarius, Eindhoven (NL)

(73) Assignee: NXP B.V., Eindhoven (NL)

( * ) Notice: Subject to any disclaimer, the term of this patent is extended or adjusted under 35 U.S.C. 154(b) by 185 days.

(21) Appl. No.: 13/320,547

(22) PCT Filed: May 28, 2010

(86) PCT No.: PCT/IB2010/052396
§ 371 (c)(1),
(2), (4) Date: Nov. 15, 2011

(87) PCT Pub. No.: WO2010/137002
PCT Pub. Date: Dec. 2, 2010

(65) Prior Publication Data
US 2012/0056553 A1    Mar. 8, 2012

(30) Foreign Application Priority Data
May 29, 2009    (EP) ..................................... 09251445

(51) Int. Cl.
*H05B 37/02*    (2006.01)
(52) U.S. Cl.
CPC ..................................... *H05B 37/02* (2013.01)
USPC ......................................... 315/291; 315/225

(58) Field of Classification Search
USPC .............................. 315/209 R, 224, 225, 291
See application file for complete search history.

(56) References Cited

U.S. PATENT DOCUMENTS

| | | | |
|---|---|---|---|
| 3,719,858 A | | 3/1973 | Gilbreath |
| 5,144,205 A | | 9/1992 | Motto et al. |
| 5,179,324 A | | 1/1993 | Audbert |
| 8,493,002 B2 | * | 7/2013 | Van Der Veeken et al. .. 315/307 |
| 2004/0195977 A1 | * | 10/2004 | Fischer et al. ................ 315/225 |
| 2006/0192502 A1 | | 8/2006 | Brown et al. |
| 2008/0203934 A1 | | 8/2008 | Van Meurs |
| 2013/0057169 A1 | * | 3/2013 | Harel ........................ 315/200 R |

FOREIGN PATENT DOCUMENTS

| | | |
|---|---|---|
| GB | 2 435 724 A | 9/2007 |
| WO | 2005/115058 A1 | 12/2005 |
| WO | 2008/029108 A1 | 3/2008 |

OTHER PUBLICATIONS

International Search Report & Written Opinion for Int'l. Patent Application No. PCT/2010/052396 (Oct. 21, 2010).

\* cited by examiner

*Primary Examiner* — Don Le

(57) ABSTRACT

A circuit for connecting to a dimmer, the circuit configured to receive an input signal from the dimmer. The circuit comprises a first load and a switch. The switch is operable to automatically engage the first load at a predetermined time from a zero-crossing of the input signal and automatically disengage the first load at other times.

13 Claims, 8 Drawing Sheets

CIRCUIT FOR CONNECTING A LOW CURRENT LIGHTING CIRCUIT TO A DIMMER

The present disclosure relates to the field of circuits for dimmers, in particular, but not exclusively, to circuits for connecting existing dimmer modules with light emitting diode (LED) light sources.

Dimmers are known to be used in domestic situations for controlling the brightness of a light in a room. Typically dimmers work by increasing or decreasing a root mean squared (RMS) voltage, and hence the average power, that is supplied to a lamp. Two known types of dimmers include triac dimmers and transistor dimmers.

A triac dimmer, which may also be known as a leading edge dimmer, works by starting to conduct a received sinusoidal mains voltage waveform partway through the phase of the waveform. A typical voltage waveform of a triac dimmer is illustrated as FIG. 1a. A trigger or firing pulse is used to control at what point the device starts to conduct thereby chopping-in the sinusoidal waveform. In this way, the dimmer only begins conducting partway through the sinusoidal waveform, and then continues to conduct until the next zero-crossing of the waveform whereupon the dimmer awaits a further trigger to begin conducting again. It will be appreciated that the later the device is fired, the later it starts to conduct, and therefore less power is transmitted to the lamp.

Trailing edge dimmers work by switching the mains supply off partway through the received sinusoidal mains voltage waveform, and waiting for the next zero-crossing before starting to conduct again. A typical waveform of a trailing edge dimmer is illustrated as FIG. 1b.

Trailing edge dimmers can include transistor dimmers. Leading edge transistor dimmers are also known, as are dual edge dimmers.

Both leading edge and trailing edge dimmers can be considered as phase control/cut dimmers because they control a proportion of the phase of the incoming AC mains voltage signal that is conducted for powering a lamp. That is, they conduct for a period of time such that a proportion of a sinusoidal waveform from the mains supply is allowed to pass to the light source, and they do not conduct for a period of time such that the remaining proportion of the sinusoidal waveform is not allowed to pass to the light source.

Dimmers are known to be used with filament lamps having power ratings of 40 W or 60 W for example. However, in order to be used with light emitting diodes (LEDs) or other low current light sources, there can be problems with known dimmers because the light sources do not draw sufficient current for the dimmers to operate correctly.

WO 2005/115058 (Polybrite International, Inc.) discloses a dimming circuit for an LED lighting device with means for holding a triac in conduction. The system disclosed therein provides a dynamic dummy load to allow a phase control dimmer to be used with LED lighting. The dynamic dummy load provides a load to the dimmer when the LED electronics do not provide sufficient load due to starter issues or ringing in the circuit, the dynamic dummy load providing a reduced flow of current when the LED and its converter electronics provide sufficient current draw from the dimmer.

The listing or discussion of a prior-published document or any background in this specification should not necessarily be taken as an acknowledgment that the document or background is part of the state of the art or is common general knowledge.

According to a first aspect of the invention, there is provided a circuit for a dimmer, the circuit configured to receive an input signal from the dimmer, the circuit comprising:
a first load; and
a switch;
wherein the switch is operable to automatically engage the first load at a predetermined time from a zero-crossing of the input signal and automatically disengage the first load at other times.

The predetermined time from a zero-crossing may be before or after a zero-crossing of the input signal.

When used with trailing edge dimmers, automatic operation of the switch can cause the first load to be incorporated into the circuit as a load on the dimmer for a proportion of the phase of a sinusoidal waveform at the end of the waveform, that is, for a predetermined period of time before a zero-crossing of the sinusoidal waveform.

When used with leading edge dimmers, automatic operation of the switch can cause the first load to be incorporated into the circuit as a load on the dimmer for a proportion of the phase of a sinusoidal waveform after the leading edge. This can be used to provide a minimum hold current and/or dampen any resonant frequencies that may be generated by the dimmer. For example, a dimmer may contain an inductor and/or a capacitor as part of a filtering circuit, and engagement of the first load for a predetermined period of time after the leading edge can be used to help alleviate any resonant frequencies generated by the dimmer. In some embodiments, the first load may take over from an existing load that is engaged up until the leading edge.

The zero-crossing of the input signal may be considered as any point within the signal at which the level becomes zero, or departs from zero. The zero-crossing can represent a time that corresponds to the zero-crossing of an input rectified AC mains signal and/or a time at which the dimmer phase cuts-in.

In this way, the first load can be actively controlled such that it is only incorporated into the circuit when it is required to provide correct operation of the dimmer. By incorporating the first load into the circuit only for a predetermined period of time, this can be a shorter period of time than is known for prior art systems where the load is constantly incorporated into the circuit. Embodiments of the invention therefore provide for more efficient operation of a circuit for a dimmer.

The first load may be considered as an active load. The output load (for example, the current drawn for causing an LED light source to be illuminated) seen by the dimmer can be too low before or after a zero-crossing of the input signal. For example, for circuits that incorporate a buffer capacitor and buffer diode, the buffer diode can stop conducting when the voltage on the capacitor is higher than the sinusoidal input.

The circuit may be known in the art as a bleeder, and according to embodiments of the invention may be considered as an active bleeder.

The first load may not be incorporated in the circuit when the output load on the dimmer is sufficient to enable correct operation of the dimmer. Use of the first load when it is not required would unnecessarily dissipate power, and therefore decrease the efficiency of the circuit.

One or more embodiments described herein provide for efficient use of a dimmer.

The input signal may be derived from a generally sinusoidal mains supply signal. The input signal may be rectified, and in some embodiments may be "phase cut" by the dimmer. It will be appreciated that "phase cut" may relate to either starting or stopping conduction of a sinusoidal waveform partway through its phase. It will be appreciated that a sinusoidal waveform has a phase of 180 degrees between zero-crossings, and that phase-cutting is performed at a phase value between 0 and 180 degrees for each phase.

Zero-crossing of the input signal may be representative of the end of a phase of the input signal. In this way, the first load can be automatically engaged at the end of each phase of an input signal.

The switch may be configured to disengage the first load when the input signal reaches zero. This can provide advantages, particularly for trailing edge dimmers, as the current drawn from the dimmer may be considered as high enough at the start of a phase, and therefore the extra current drawn from the first load may not be required.

The switch may be configured to disengage the first load at the predetermined time after the zero-crossing of the input signal, and this can provide for convenient implementation of the circuit.

The switch may be automatically operable at a threshold voltage that represents the predetermined time from a zero-crossing of the input signal. It will be appreciated that the threshold voltage can be selected so as to provide the desired predetermined time using knowledge of the amplitude and frequency of the input signal, for example, which can be derived from a known sine wave.

The first load may be a resistive load, a current source, or an energy storing device for example. Use of an energy storing device can provide for a particularly efficient implementation whereas use of a resistive load can be easy and cheap to implement. A resistive load uses passive components only and can increase the power factor of the circuit.

The dimmer may be a trailing edge (transistor) dimmer. The circuit may be for use with a light source, such as an LED light source. The LED light source may be controlled by a switched mode power supply (SMPS). The SMPS may be the output load experienced by the dimmer.

The predetermined time may be fixed independently of a dimming level of the dimmer. This may provide for a relatively simple implementation of the invention and still be considered to provide adequate performance across the entire dimming range of the dimmer.

In other embodiments, the predetermined time may be adjustable in accordance with a dimming position/level of the dimmer. Such examples may allow the predetermined time to be adjusted in accordance with a current dimming level in order for the power consumption, and hence efficiency, to be optimised for operation at different dimming levels. Also, the predetermined time can be adjustable to provide support for leading edge triac dimmers. The first load can also provide hold current for the triac, and if the predetermined time is too short, problems occur if the dimming level is low as the triac switches off after initial ignition and is then re-ignited by the engagement of the first load, and its associated current. Such re-ignition can lead to an unstable situation and can result in a flicker of the output.

The circuit may further comprise:
  a second load; and
  a second switch;
    wherein the second switch is operable to automatically engage the second load at a second predetermined time from a zero-crossing of the input signal, and automatically disengage the second load at other times.

The second load and switch, which may be considered as a second bleeder can be used to ensure that a timing circuit of a leading edge triac dimmer is reset properly. The second load can be used to provide an (in some embodiments relatively low) effective output resistance around zero-crossing such that the timing circuit inside the dimmer is properly reset.

The second load can be used for triac dimmer support.

The first load can be used to provide the triac dimmer with hold current (the minimum current) as well as supporting trailing edge transistor dimmers by providing sufficient current to power the transistor dimmers.

The first and second loads may be used in combination, with different predetermined switch-on times, in order to provide a more sophisticated load response as the voltage output by the dimmer varies.

The second switch may be configured to disengage the second load when the first switch engages the first load, or vice versa. In this way, a hand-over/handshake can occur between the bleeders/active loads such that only one of the active loads is engaged at any one time. In this way, the first and second load can be selected to have a more optimal dimmer load at a particular setting and time interval. For example, the first load may be considered as a weak bleeder because it is applied when the voltage is still quite high, and the second load can be considered as a strong bleeder (optionally with lower impedance) because the voltage is lower when its load is engaged. This can provide advantages in efficiency and may be convenient in terms of implementation.

In some embodiments, the first and second loads may be replaced by a single load system where the value of the load is automatically adaptable in accordance with the input voltage, and in this way the consumed power constant can be kept substantially constant.

Good efficiency can be maintained by having the second load engaged for a shorter period of time than the first load. For example, this can avoid having to use the second load to provide hold current for a leading edge triac dimmer as this functionality can be provided by engagement of the first load. Operating in this way can improve efficiency and avoid the requirement for a larger switch.

In some embodiments the weak bleeder can be disengaged when the strong bleeder is engaged. This can be considered acceptable as the weak bleeder may draw only 10% of the current that the strong bleeder draws, and therefore omission of the weak bleeder when the strong bleeder is active may not significantly affect the operation of the circuit.

In embodiments where the circuit is embodied by an integrated circuit (IC), the trigger levels for the strong and weak bleeders can be detected at separate pins of the IC. For example, there may be a "weak bleed" pin and a "strong bleed" pin. If both bleeders were on at the same time, the current through the bleeder resistors would result in a voltage drop. As a result, it may be difficult to determine the exact voltage of the rectified mains input via the bleeder pins. Therefore, it can be advantageous from an implementation point of view for at least one of the "weak bleed" and "strong bleed" pins to be off to properly detect the level of the rectified mains voltage.

It will be appreciated that any number of switches and loads can be provided, in order to provide any number of "bleeders", according to further embodiments of the invention.

The predetermined time may be of the order of 2 milliseconds. The input signal may be derived from a mains alternating current supply with a frequency of 50 hertz.

There may be provided a circuit for a dimmer comprising an in-rush current limiter. The circuit may or may not be used in combination with the circuit of the first aspect of the invention. The in-rush current limiter may have a limit level that is controllable in accordance with a dimming level of the dimmer, and may be provided as a damper for a dimmer. In this way, the efficiency of the dimmer can be improved when compared with the prior art as a "jump" in the output at a voltage corresponding to the limit level is encountered can be reduced and/or eliminated. That is, the limit level of the in-rush current limiter can be actively adjusted in accordance with the dimmer level so that efficient and stable/consistent operation of the circuit connected to the dimmer can be achieved.

According to a further aspect of the invention, there is provided a method of operating a circuit for a dimmer, the circuit comprising a first load, the method comprising:

receiving an input signal from a dimmer;
automatically engaging the first load at a predetermined time from a zero-crossing of the input signal; and
automatically disengaging the first load at other times.

A description is now given, by way of example only, with reference to the accompanying drawings, in which.

One or more embodiments described herein relate to a circuit/controller for a dimmer that enables existing dimmer modules (including triac and transistor dimmer modules) to be used with different lighting sources, including light emitting diode (LED) and fluorescent lamps. Examples described herein utilise a first active resistive load, which may be known as a "bleeder", that is configured to provide/activate/engage a resistive load for a predetermined period of time before or after a zero-crossing of the rectified mains input signal. Such an example may be particularly advantageous for trailing edge (transistor) dimmers in order for a sufficient load to be provided to the dimmer when the dimmer is not conducting. In some examples, the length of the predetermined time for which the active resistive load is provided before the zero-crossing can be set in accordance with a dimming level of the dimmer.

Advantages associated with such examples can include low power dissipation by the active resistive load as the output voltage for the driver of the light source is much lower at that point, whilst retaining a sufficient load for the dimmer to provide adequate performance.

Other embodiments described herein can be suitable for leading edge (triac) dimmers, wherein an intentionally high latching current of the triac is used, but a zero holding current is provided. In this way, consistent behaviour of the triac, and therefore consistent behaviour of the whole system, can be achieved. This may be because the holding current of the triac cannot fluctuate above and below the holding current as in the prior art, and any flicker of the lights by the current dropping below the holding current can be reduced. In addition, a significant amount of energy dissipation is avoided, as no hold-current bleeder is necessary, and this improves the efficiency of the system.

It will be appreciated that one or more embodiments described herein can be provided in combination such that a single circuit (such as an integrated circuit) can be used with dimmers of different types. Features of one embodiment of a circuit for use with a dimmer described herein may not conflict with features of other circuits. In this way, a generic dimmer control circuit, for different types of dimmers, can be provided.

Figure 1A:
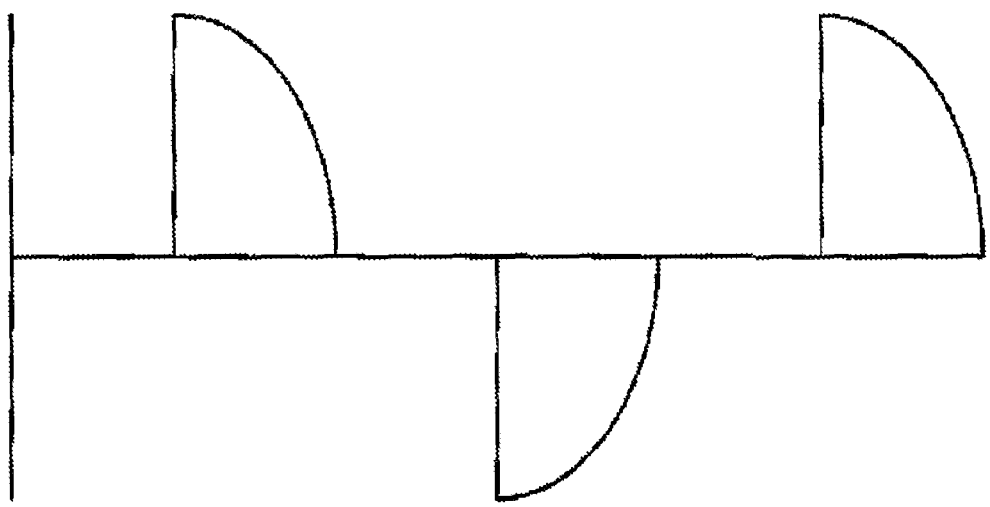
FIGS. 1a and 1b illustrate typical voltage waveforms of phase-cut dimmers.
Figure 1B:
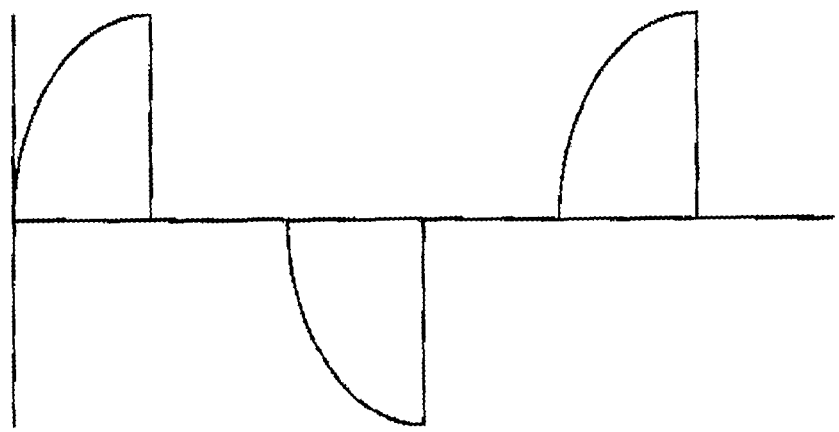
Figure 2A:
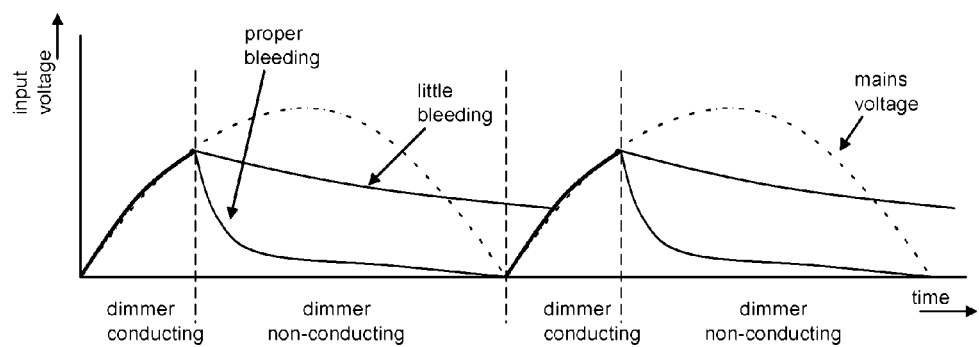
FIGS. 2a and 2b illustrate graphically the performance of a dimmer.
Figure 2B:
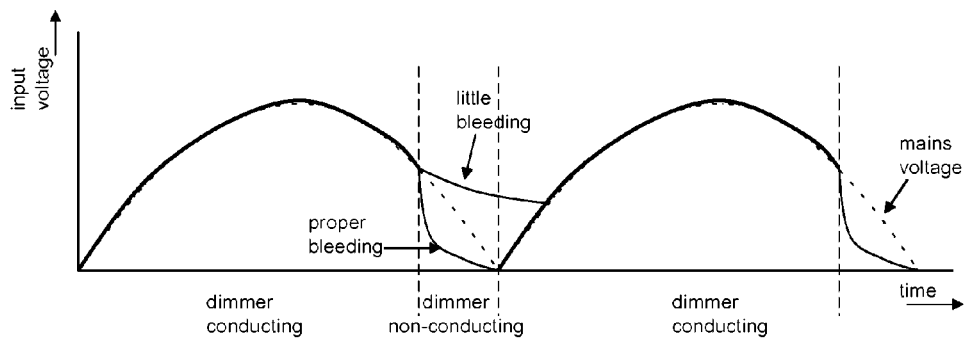

FIGS. 2a and 2b illustrate output voltages generated by dimmers controlled by prior art controllers. FIG. 2a illustrates the performance of a dimmer that has been "deeply dimmed", that is, the brightness of the associated lamp will be low. FIG. 2b illustrates the output voltage when the dimmer is set to a maximum light output.

To support trailing edge dimmers, much energy must be absorbed by a prior art bleeder in order for the dimmer to perform correctly every cycle. This is required for: a) the dimmer to generate its power supply voltage correctly; and b) the timing of the dimmer to be correctly operated.

As shown in FIGS. 2a and 2b, too little bleeding can be applied by the prior art such that the output voltage for the driver circuit of the light source will not return to zero. This means that the dimmer will not operate properly. As can be seen from FIG. 2b, the problem is even more significant when the dimmer is set for high light output levels.

A problem is that in order to achieve proper bleeding (as shown in FIGS. 2a and 2b) with the prior art systems/methods, a lot of power is consumed, and devices cannot operate efficiently.

To bleed properly, a trade off should be made such that the deeply dimmed and nearly undimmed operation is satisfactory.

Figure 3:
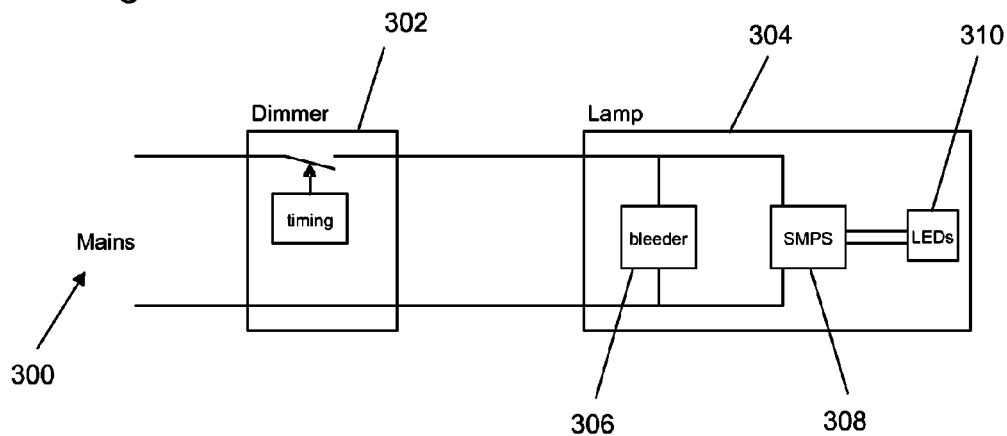
FIG. 3 illustrates schematically a circuit according to an embodiment of the invention.

FIG. 3 illustrates a circuit for use with a dimmer, which may be known as a dimmer control circuit. In this example, the circuit is shown as bleeder 306 and is an embodiment of the invention. The bleeder 306 is shown as part of the lamp module 304, although it will be appreciated that the bleeder 306 could be provided as a separate component, for example as a separate integrated circuit (IC). The separate IC may be a light source driver module, such as an LED driver module.

In this example, a mains voltage supply 300 is provided to a trailing edge dimmer 302. The outputs of the dimmer 302 are provided to the bleeder 306 and switched mode power supply (SMPS) 308 in parallel. As known in the art, SMPS's are used to provide suitable power for LED light sources 310. Operation of the bleeder 306 will be further described with reference to FIG. 4.

Figure 4A:
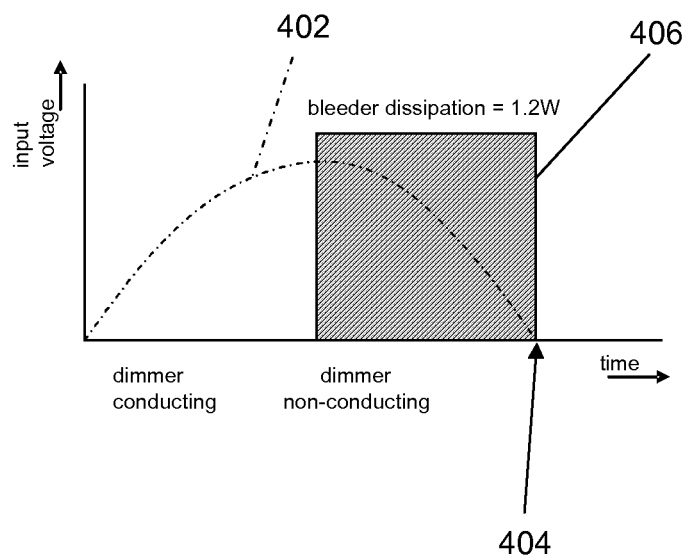
FIGS. 4a and 4b illustrates graphically the performance of a circuit according to an embodiment of the invention.
Figure 4B:
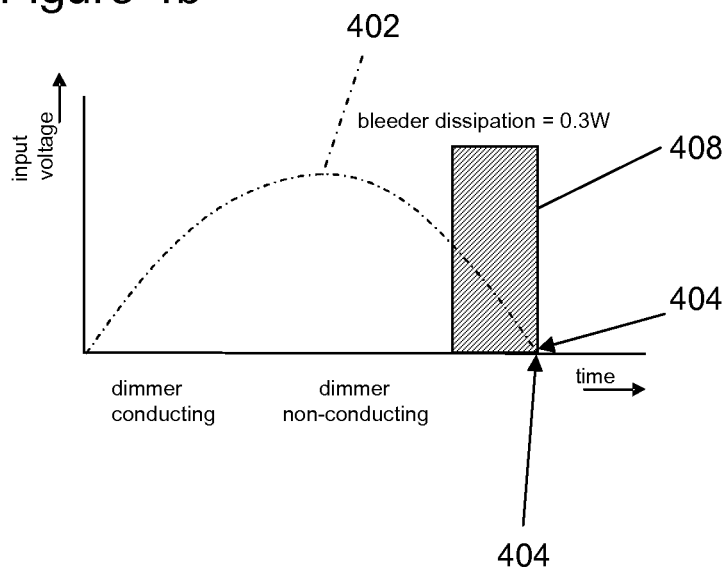

FIGS. 4a and 4b graphically illustrate the operation of the bleeder 306 of FIG. 3. The bleeder 306, which in this example comprises a resistive load, is engaged/enabled for a predetermined period before an instance in time at which the rectified mains supply voltage reaches/crosses zero. It will be appreciated that "engaging/enabling" the resistive load may consist of changing the state of a switch such that the resistive load is incorporated into the circuit.

The rectified mains voltage supply is illustrated as dashed line with reference 402 in FIGS. 4a and 4b. It will be appreciated that for trailing edge dimmers, the dimmer is conducting for a first portion of the rectified mains voltage supply, and is not conducting for a second portion of the rectified mains voltage supply, up until the zero-crossing. The zero-crossings are marked as reference 404 in FIGS. 4a and 4b.

FIG. 4a illustrates operation/enablement of the bleeder for a first example predetermined time 406 of a "phase" of the rectified mains supply voltage. FIG. 4b illustrates operation/enablement of the bleeder for a second example period of time 408 for a "phase" of the rectified mains voltage supply waveform. It will be appreciated that "phase" in this context relates to the 180° of the sine wave between zero-crossings. The first example period of time 406 relates to 50% of a single phase, and the second example predetermined time 408 represents 20% of a single phase.

When these predetermined times 406, 408 are applied to the circuit of FIG. 5, which will be described later and includes, a 22 k Ω resistive bleeder used with a 230 volts, 50 Hertz mains AC voltage supply, the first predetermined time 406 dissipates 1.2 watts of power, and the second predetermined time 408 dissipates 0.3 watts of power. For this example, the second predetermined period of time 408, which corresponds to 2.0 milliseconds, provides adequate control of the dimmer without dissipating unnecessary power. In some embodiments, using a predetermined time of the order of 2 milliseconds has been found to be advantageous.

It will be appreciated that the selection of the length of the predetermined time is a compromise. If the time is too high/long, then the transistor will unnecessarily dissipate too much power. If the time is too low/short, then insufficient load will be provided for the transistor dimmer, which will cause the dimmer to operate incorrectly. In turn, this can lead to a flicker in the dimmed light source or other inadequate performance.

It will also be appreciated that a controller for a dimmer as described above will work with leading edge dimmers, without significantly degrading the quality of the operation of such a dimmer. This can be because the additional load replaces that required by leading edge dimmers, and/or the additional dissipation is small in comparison with the lamp power and therefore the additional power dissipation can be deemed acceptable.

In some embodiments, the predetermined time that the bleeder is activated/enabled can be controlled by triggering the bleeder when the input voltage reaches a certain threshold level. It will be appreciated that for a fixed frequency, fixed amplitude, mains supply voltage the time at which the input voltage reaches a predetermined level always occurs at the same time within the phase of the signal. For the example described above, a predetermined time of 2 milliseconds corresponds to 60% of the maximum input voltage.

In some embodiments, the voltage level at which the bleeder is activated can be varied in accordance with a detected position/level of the dimmer. For example, at maximum light output the predetermined voltage level may be 70%, and at minimum light output the predetermined voltage level may be 50%. It will be appreciated that these values can be selected in order to provide a balance between the power dissipation of the transistor and ensuring that sufficient load is applied for the transistor dimmer to operate correctly. In some examples, the desired value for the threshold voltage level (and hence the predetermined time) can be determined empirically.

Using a bleeder that is activated at a different predetermined period of time before a zero crossing in dependence upon the dimmer position/level can provide advantages when the bleeder is used with leading edge triac dimmers. For example, the bleeder can also provide hold current for the triac, and the predetermined time can be controlled so that the triac does not switch off after initial ignition and then re-ignite by the engagement of the bleeder.

In some examples, a predetermined time of 2 ms may be considered as too short for leading edge triac dimmers with low dimming levels/positions and therefore the predetermined time can be increased for low dimming positions in such examples. The predetermined time may be long enough to ensure that the triac doesn't switch off after initial ignition and then re-ignited by the engagement of the bleeder/first load, and its associated current. Such re-ignition can lead to an unstable situation and can result in a flicker of the output.

The predetermined time can be adjustable to provide support for leading edge triac dimmers.

Figure 5:
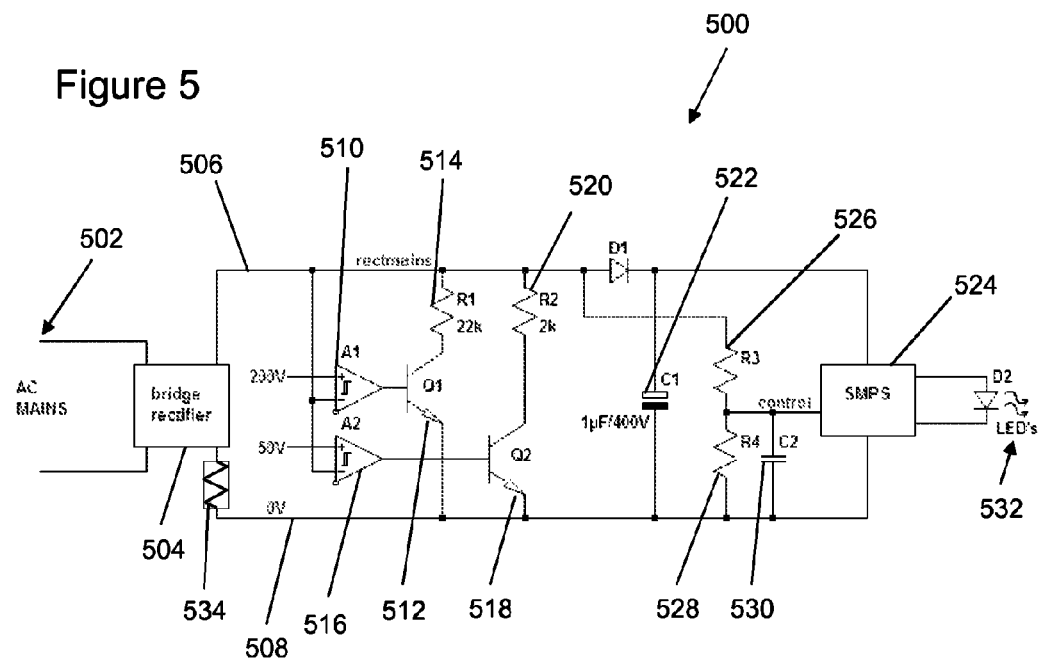
FIG. 5 illustrates schematically a circuit according to an embodiment of the invention.

FIG. 5 illustrates a schematic circuit diagram of a circuit 500 according to an embodiment of the invention. In this embodiment, two bleeders are implemented for activation at different phases of the mains signal as described in more detail below. The bleeders may be referred to as a "strong bleeder" and a "weak bleeder".

The circuit 500 is powered by an alternating current (AC) mains supply 502. The mains supply 502 is provided to a bridge rectifier module 504, the two outputs of which are labelled "rectmains" 506 and 0V 508. The circuit 500 includes a damper resistor 534 in order to limit any peak in-rush current that may be received from the mains. The damper resistor 534 may have a value of about 100 to 200 ohms.

The "rectmains" output 506 of the bridge rectifier module 504 is the positive output of the bridge rectifier module, and is connected to the negative input of a first comparator 510 that forms part of a first "bleeder". The positive input of the comparator 510 is held at 200 volts such that the output of the comparator 510 causes a first active resistive load to be engaged/incorporated into the circuit when the positive output 506 of the bridge rectifier module 504 falls below 200 volts. This will now be described in detail.

The output of the first comparator 510 is connected to the base of a first transistor 512. The emitter of the transistor 512 is connected to ground, and the collector of the transistor 512 is connected to the positive output of the bridge rectifier 506 by resistor R1 514. It will be appreciated that the resistor R1 514 is provided as an active resistive load that is engaged when the positive output 506 of the bridge rectifier module 504 falls below 200 volts. The active resistive load is in parallel to the output load that drives the LED's. In this way, the active resistive load can be engaged/activated for a predetermined time (corresponding to the threshold voltage of the positive input of the comparator 510) before a zero-crossing of the bridge rectifier 504 output signal, and disengaged at other times.

It will be appreciated that the transistor 512 operates as a switch to engage or disengage an additional load R1 514 in dependence on the voltage level of the positive output of the bridge rectifier 504.

A second bleeder is provided in a similar way to the first bleeder, but this time is only engaged when the bridge rectifier 504 output voltage drops below 50 volts. A corresponding comparator 516, transistor 518, and resistor R2 520 are provided as components of the second bleeder.

In this example, the resistor R1 514 of the first bleeder has a value of 22 k Ω, and the resistor R2 520 of the second bleeder has a value of 2 k Ω. The values of the resistors R1 and R2 514, 520 are selected to represent current loads that are required so that dimmers to which the circuit can be attached can operate properly.

The first bleeder may be referred to as a "weak bleeder" and the second bleeder may be referred to as a "strong bleeder" as it is activated at a lower voltage than the "weak bleeder". The strong bleeder may be considered as strong as it uses a lower resistance to draw a larger current.

The circuit 500 of FIG. 5 also includes a capacitor C1 522 connected between the outputs of the bridge rectifier 504 to provide a buffer for the SMPS 524 and provide a more constant voltage to act as a DC source for the the switched mode power supply (SMPS) 524 by smoothing the output of the rectifier module 504. The capacitor 522 can also consume the latching current that is required for triac dimmers.

The resistor R3 526, resistor R4 528 and capacitor C2 530 are provided to determine the average voltage of the positive output 506 of the bridge rectifier module 504 in order to control the SMPS 524 and dim the light level according to the phase cut of the dimmer. The resistors R3 526 and resistor R4 528 are connected in series between the outputs of the bridge rectifier 504. The capacitor C2 530 is connected in parallel across resistor R4 528. The control input of the SMPS module 524 is connected to the junction between the two resistors R3 and R4 526, 528.

The SMPS module 524 is connected to one or more LED's 532 in order to provide the light output.

Figure 6:
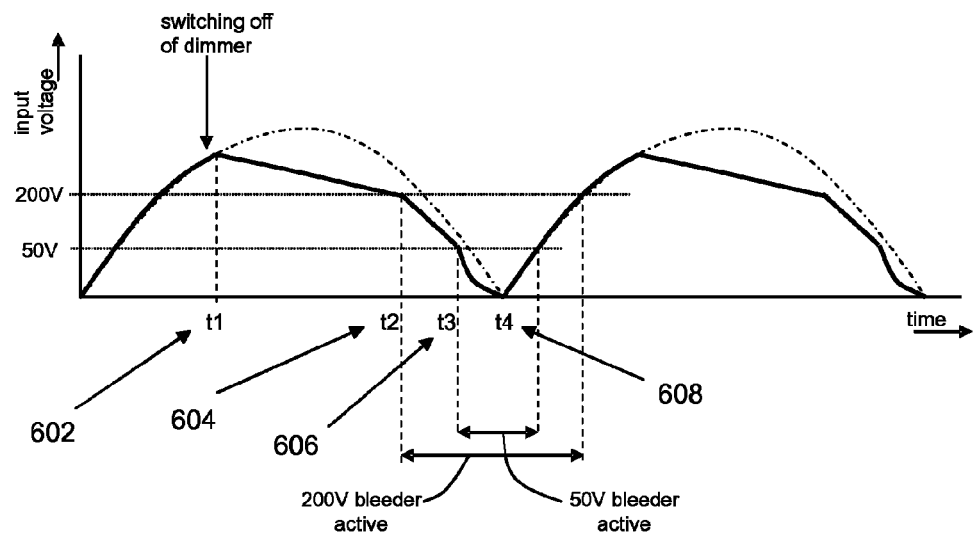
FIG. 6 illustrates graphically the performance of a circuit according to an embodiment of the invention.

FIG. 6 illustrates graphically the input voltage for the SMPS module 524 according to an embodiment of the invention.

The input voltage rises according to the sinusoidal mains voltage input up until time t1 602. At time t1 602, the dimmer switches off, and the voltage gradually falls until it reaches a value of 200 volts at time t2 604. At time t2, the first bleeder illustrated in FIG. 5 engages the resistive load R1 514 such that the input voltage falls more sharply as power is dissipated by the resistor R1 514. The input voltage continues to fall until it reaches a value of 50 volts at time t3 606.

At time t3 606, the second bleeder automatically engages the second resistive load R2 520, and the input voltage for the SMPS module 524 falls more sharply still such that, in this example, the input voltage reaches zero at the same time that the original mains supply voltage would have reached zero. This time is illustrated as t4 608 in FIG. 6.

It will be appreciated that in this embodiment, the resistors of the second and first bleeders continue to be engaged until the subsequent rise of the input voltage for the next phase exceeds the 50 volts and 200 volts thresholds respectively, although in other embodiments the bleeders may be configured such that they are disengaged at the end of the phase at time t4 608.

Figure 7:
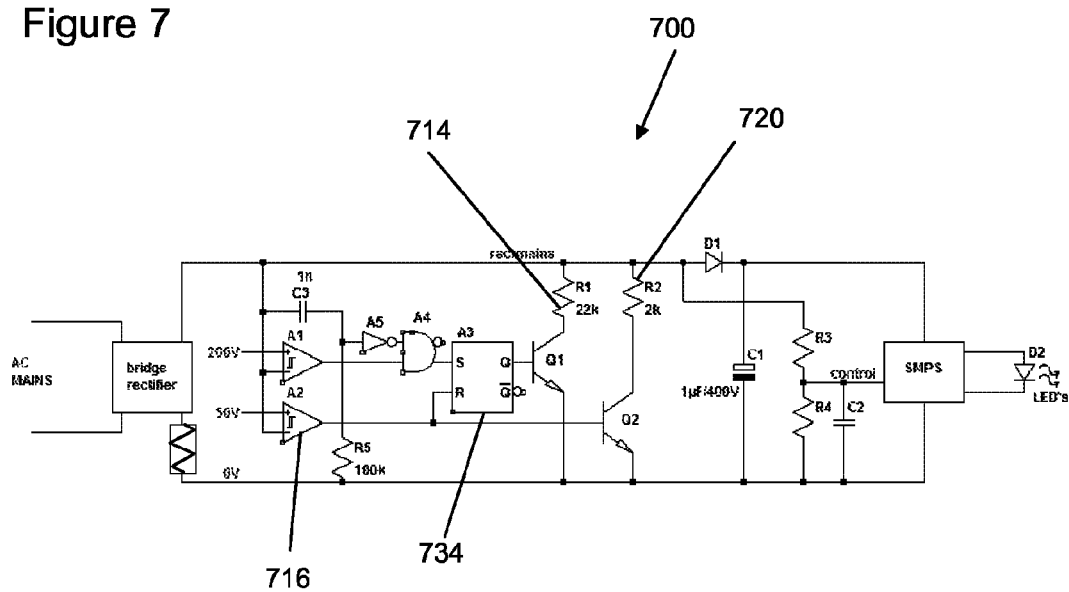
FIG. 7 illustrates schematically a circuit according to an embodiment of the invention.

FIG. 7 illustrates a circuit diagram of a circuit 700 according to another embodiment of the invention. The circuit of FIG. 7 is similar to the circuit of FIG. 5, but this time includes a memory device 734 such that the resistors of the two bleeders are only engaged at the end of a phase cycle, and not at the beginning of a phase cycle when they may be considered to be unnecessary as the dimmer is conducting anyway. In this example, the memory device comprises an SR flip-flop 734.

Furthermore, SR-flip-flop 734 is configured such that the output of the second comparator 716 is connected to the reset input of the SR flip-flop 734. In this way, the resistive load 714 of the first bleeder is disengaged when the resistive load 720 of the second bleeder is engaged.

One or more embodiments described herein can also improve the operation of leading edge triac dimmers. The improvement can be in terms of stability and/or efficiency.

It is known that triac dimmers require a minimum latching current when the triac "fires" to "cut-in" the sinusoidal waveform. Thereafter, triacs that are used in dimmers are known to require a holding current in order to stay in conduction. The holding current is less than the minimum latching current. A known solution to enable triac dimmers to operate correctly is to ensure a current is constantly drawn from the dimmer, and in this way, the triac is kept in conduction mode until the end of each cycle/phase. Part of this current is used to charge the buffer for normal lamp operation, and this is typically a short pulse of very high current. However known bleeders draw a relatively low current for the remaining time, and this current is solely used to ensure correct operation of the dimmer and is not current that is not supplied to the lamp. This can lead to inefficient operation of the bleeder.

One embodiment described herein uses a triac that has an intentionally high latching current, but a zero holding current. That is, the triac is allowed to switch off by allowing the holding current to fall to zero thus entering a stable, off, state. This is different to prior art circuits where the holding current is maintained above zero so that the triac does not switch off.

Such an embodiment can result in a consistent behavior of the triac, particularly with regard to the switch-off timing of the triac, which in turn can lead to a stable behavior of the whole system. According to such embodiments, a hold-current bleeder may not be necessary as the triac is allowed to switch off. That is, the triac does not switch between being on and off as the load current varies around the non-zero holding current. Furthermore a significant amount of power dissipation can be saved, thereby improving the efficiency of the circuit substantially.

In some embodiments, the strong bleeder may still be required in order to reset the internal timer of the dimmer, but the weak bleeder may not be required to provide a holding current for the triac leading edge dimmer.

It will be appreciated that the embodiment described and illustrated as FIG. 5 may not prejudice operation of the dimmer control circuit with a triac dimmer. The fixed bleeder for the trailing edge dimmer may not degrade operation when used with triac (leading edge) dimmers, as the triac will not incorrectly re-fire when the bleeder is activated at the end of the cycle. It will be appreciated that a triac is ignited by a voltage difference. The voltage difference at the end of the phase will not reach the trigger voltage and the weak bleeder current will be too low to meet the minimum triac latching current. Such embodiments may use a dimmer position dependent weak bleeder as described below with reference to FIG. 12.

One or more embodiments described herein may be considered to comprise of three features:

A low-impedance bleeder, which activates around the zero-crossing of the mains input and completely discharges the RC capacitor in the dimmer.

A buffer circuit that consists of a diode D1 and a capacitor C1.

An SMPS (switched mode power supply), which converts the power to the low voltage needed by the LED's.

Figure 8:
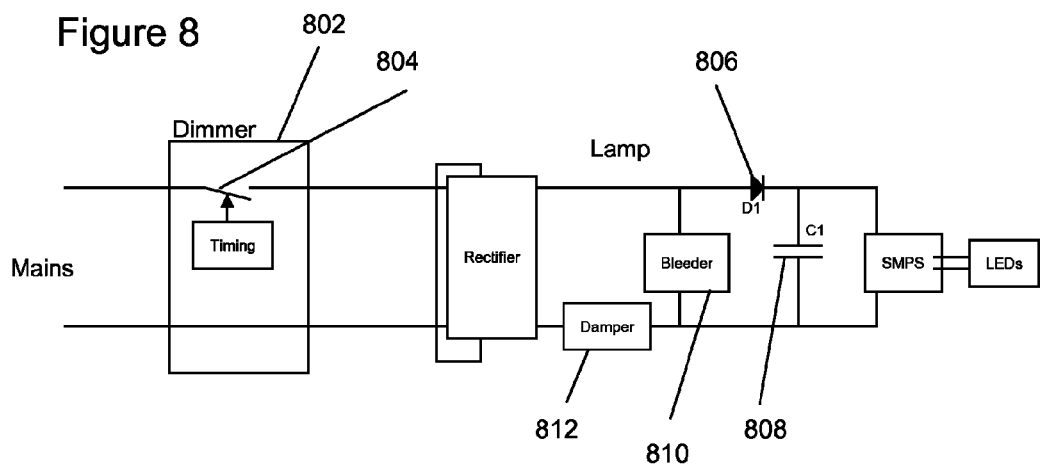
FIG. 8 illustrates schematically a circuit according to another embodiment of the invention.

FIG. 8 schematically illustrates a circuit according to such an embodiment of the invention.

In this embodiment, where the dimmer 802 is a transistor, trailing edge dimmer, the dimmer switch 804 opens at the selected trigger phase. The buffer diode 806 shortly conducts to charge the buffer capacitor C1 808. The dimmer 802 is then left un-loaded after the conduction period when the switch was closed, and as a result the dimmer 802 switches off. As described above, the low-impedance bleeder 810 is only activated near the zero-crossing in order to provide a load for the dimmer 802 and reset the timing circuit inside the dimmer 802.

Figure 9:
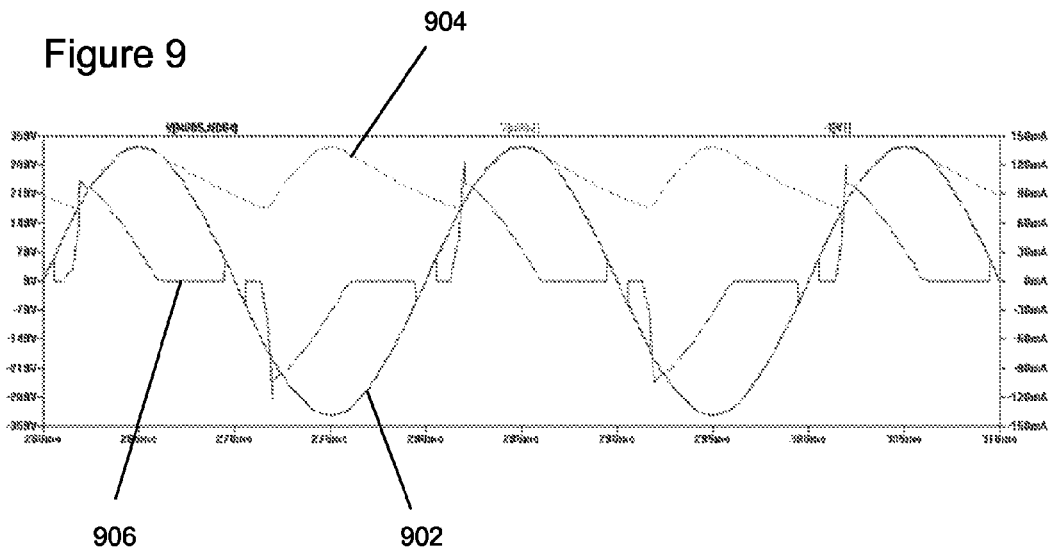
FIGS. 9 to 11 illustrate graphically the performance of circuits according to embodiments of the invention.

This operation is illustrated in the graph of FIG. 9. The sinusoid line 902 represents the input voltage (mains) and the saw-tooth line 904 at the top of the graph represents the buffered (rectified) voltage across C1 808. The remaining line 906 in the middle represents the input current to the bridge rectifier.

In some embodiments, it may be preferable to limit the charging current when the buffer is charged. If the current is only limited by the equivalent series resistance (ESR) of the capacitor 808, the diode 806 and the internal components of the dimmer 802, then the peak in-rush current can become very high and the dimmer 802 can behave erratically.

In a low-cost, limited space design, the in-rush current can be limited using a damper resistor 812. However, when the system is optimally dampened, this resistor 812 can reduce efficiency substantially because it consumes input power without contributing to the output power. Furthermore, use of such a damper resistor 812 will dissipate power even if a lamp is connected directly to the mains supply, that is, not through a dimmer. Therefore, such a damper resistor 812 will not only reduce efficiency when used with a dimmer circuit, but also when the lamp is connected to mains without a dimmer as the resistor wastes energy.

A solution to this problem is to replace the resistor 812 with an active in-rush current limiter. An active in-rush current limiter comprises a current source that has low impedance up to the point where the current crosses a certain threshold, that can be selected so that it is just above the normal operating current value. For example, the threshold value may be selected so that it is 10% above the normal operating current value. In this way, little power is lost when connected to a mains supply as the current does not exceed the threshold during normal operation, and therefore the current source usually provides low impedance. Furthermore, less power is wasted when the lamp is connected to a dimmer as the impedance is only increased as required, and this is determined by the setting of the threshold such that the threshold is not exceeded unless additional load is required.

However, when combining highly efficient lamp designs with an active in-rush current limiter as described above, a discontinuity in the dimming curve of all leading-edge dimmers can occur. The reason for this can be seen in FIGS. 10 and 11. Note that these images only show simulations of a rough model of the system. However, they give a good impression of the resulting current. In the figures, the lower saw-tooth lines 1002, 1102 represent the rectified phase-cut mains voltage, the upper saw-tooth lines 1004, 1104 the buffer voltage, and the remaining lines with the peaks shows the input current 1006, 1106.

Figure 10:
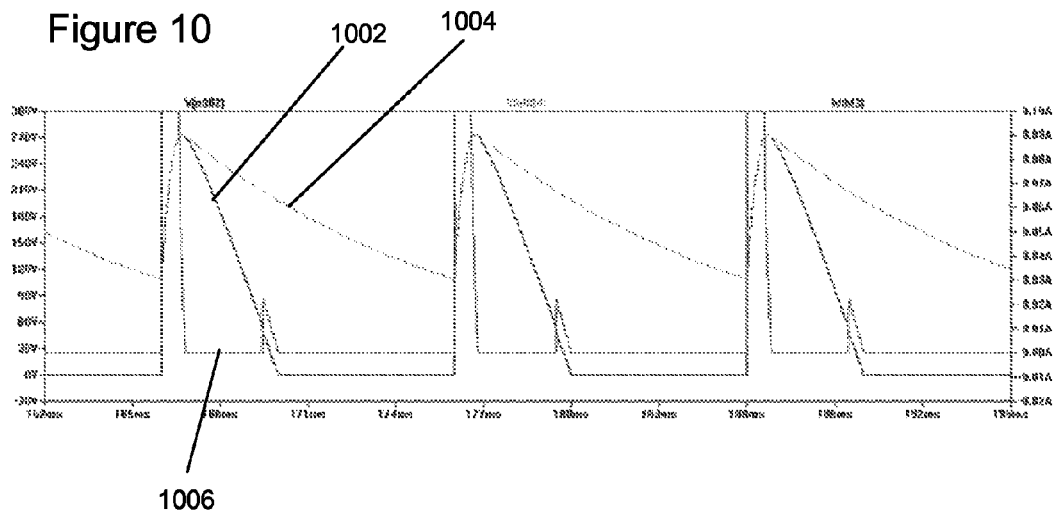

FIG. 10 shows the input voltage and current for dimmer positions below 50%. The current around the trigger point only has a short peak and then returns to zero (see line 1006) this is because the dimmer switches on while the rectified voltage is falling. As a result the dimmer immediately switches off and the input voltage drops. The system behaves this way for all dimmer positions under 50% as the dimmer always switches on whilst the rectified voltage is falling. This can mean that only a short pulse of input current is provided, the buffer capacitor is not charged, therefore no current flows through the circuit and the triac switches off.

Figure 11:
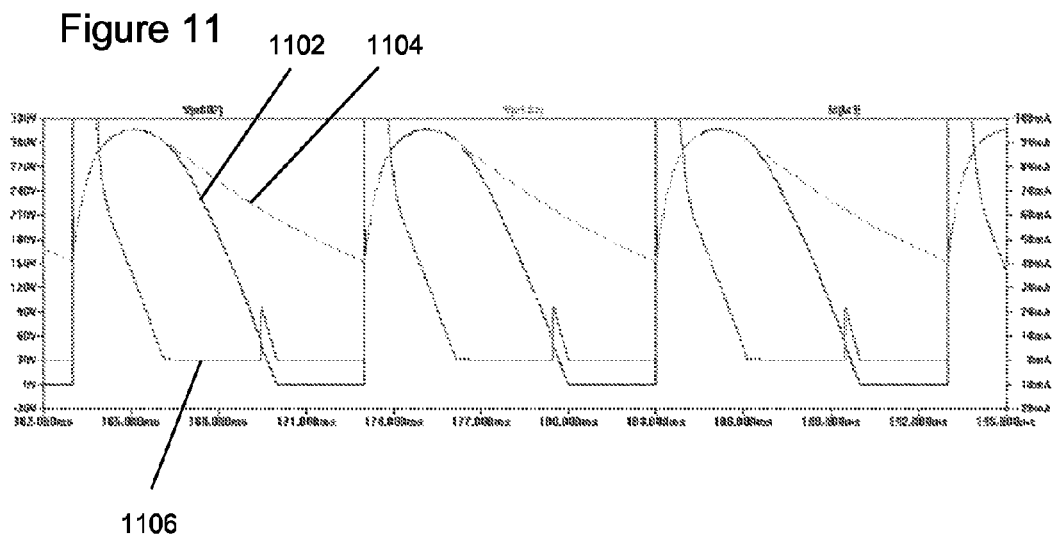

FIG. 11 shows the input voltage and current for dimmer positions above 50%. Now the current 1106 has a different shape: It first has a peak during which the buffer is charged to the mains level, but now the diode keeps conducting because the mains level is still rising when the leading edge dimmer cuts in the phase of the rectified voltage. As a result, the dimmer switch stays open for a longer time and the curve is different, as can be seen by comparing the input current lines 1006, 1106 of FIGS. 10 and 11.

Therefore, when the dimmer level is below 50%, the triac will be conducting briefly, and for dimmer levels above 50% it will conduct for a much longer time. A problem occurs when the dimmer level is around 50% as there is a sudden jump from one state to the other as the leading edge dimmer either cuts in when the rectified voltage is rising or falling, and this results in a discontinuity in the output. If the jump would occur at exactly 50% the result on the light output would be small. However, due to the damping of the SMPS with an inductance before the buffer, it happens little over 50% and is noticeable.

According to an embodiment of the invention, a dimmer-level dependent in-rush current limiter can be used to equalize the current and voltage curve over the whole dimming range. This can be achieved by making the limit/threshold level of an active in-rush current limiter dependent upon the dimmer position.

Such an embodiment can reduce or eliminate the "jump" on the output, as the dimmer level is adjusted about the 50% (or any other dimmer threshold level that is used by the active in-rush current limiter), whilst maintaining high efficiency by not activating an impedance associated with the current source when it is not required.

Figure 12:
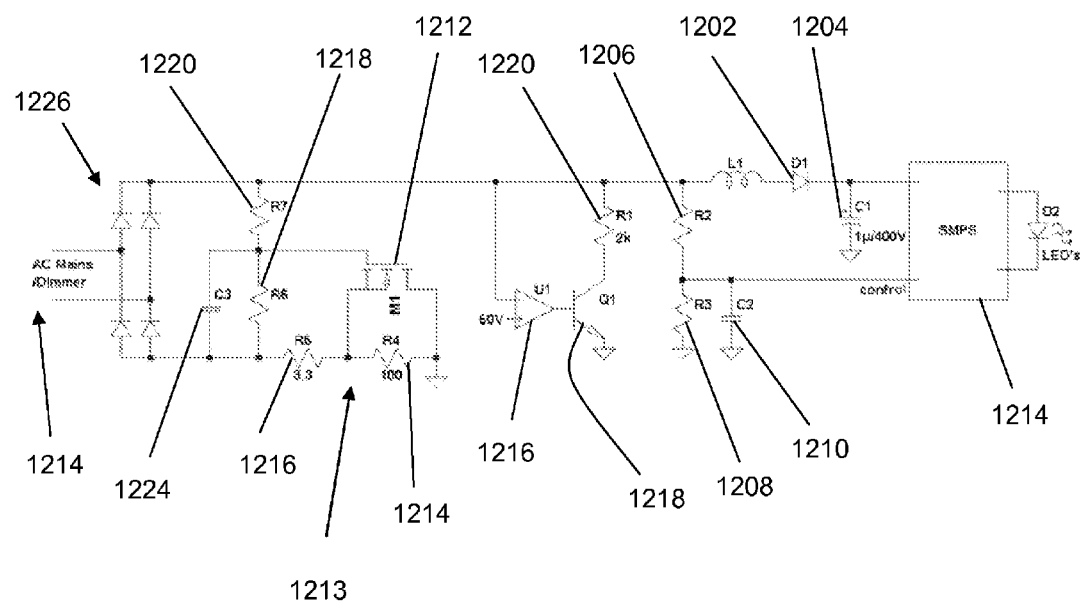
FIG. 12 illustrates schematically a circuit according to another embodiment of the invention.

An embodiment of a circuit according to an embodiment of the invention is shown as FIG. 12. This embodiment provides a dimmer-level dependent in-rush current limiter 1213.

In the circuit of FIG. 12, diode D1 1202 and capacitor C1 1204 make up a buffer circuit. Resistor R2 1206, resistor R3 1208 and capacitor C2 1210 are used to divide and filter the mains voltage 1212 supplied by the dimmer, to determine the dimmer level. This dimmer level is then used to control the light output by supplying it as the control input to SMPS 1214.

Transistor M1 1212 and resistors R4 1214 and R5 1216 make up a current source that acts as an active in-rush current limiter 1213. When the current through R5 1214 is low, the bias voltage at the gate of M1 is above the threshold voltage of the transistor and the transistor closes thereby bypassing resistor R4 1214. The rest of the system only sees the 3.3 ohm resistor R4 1216 as a damper load and therefore not much power is dissipated by the active in-rush current limiter.

As the current through R5 1216 increases, the Source voltage of M1 1212 also increases. At a certain level the Gate-Source voltages approach the threshold of the transistor M1 1212 and the transistor begins to open. As the transistor M1 1212 opens, the system will see an increased damper impedance as the resistor R4 1214, having a value of 100 ohms, is incorporated into the damper load.

This bias level of the transistor M1 1212 determines the level at which the current is limited. In this embodiment, the bias voltage is controlled such that it is dependent on the dimmer position. At low dimmer positions the limiting level of the transistor M1 1212 should be low, and at high dimmer positions the limiting level should be higher.

In the circuit of FIG. 12, this is achieved by using a simple filtered voltage divider to control the voltage at the gate of the transistor M1 1212 in accordance with the dimmer level determined from the rectified voltage output from the dimmer. The voltage divider comprises resistor R6 1218, resistor R7 1220 and filtering capacitor C3 1224. The resistors R6 1218 and R7 1220 are connected in series across the outputs of the rectifier 1226 output, and the capacitor C3 1224 is connected in parallel across resistor R6, which is the resistor connected to the low output of the rectifier 1226. In this way, the two resistors R6 1218 and R7 1220 in series divide the output voltage of the rectifier 1226 and the capacitor C3 1224 smoothes the alternating voltage. The voltage level at the junction between the resistors R6 1218 and R7 1220 is indicative of the dimmer level of the dimmer. It will be appreciated that in some embodiments the resistor R6 1218 could be replaced with a Zener diode in order to provide a constant current in-rush current limiter.

An alternative embodiment uses a bipolar transistor and a resistor to the rectified mains, which limits the base current to provide a signal that is indicative of the dimmer level.

As can be seen from the circuit diagram of FIG. 12, a bleeder that provides an active resistive load at the end of a phase (that is when the voltage at the positive output of the rectifier module 1226), as described above is also provided. In this example, the bleeder is provided by comparator 1216, transistor 1218 and resistor R1 1220 in a similar way to the corresponding components of FIG. 5.

It will be appreciated that a bleeder that provides an active resistive load at the end of a phase may not be essential for a circuit that provides an active in-rush current limiter 1213 as described herein as one or more of the advantages of such an active in-rush current limiter 1213 may be independent of the use of such a bleeder.

According to one embodiment of the invention, the more the input is dimmed (low light level), the more power is dissipated in the damper. This damper dissipation is little for highly dimmed inputs due to the smaller input currents and the bypassing of a damper resistor in the active in-rush current source. The damper can have reduced/minimal power dissipation at maximum light level, which in turn benefits the efficiency of the circuit.

It will be appreciated that LED lamps can be connected to any conventional phase cut dimmer using one or more embodiments described herein, and that the efficiency of the power used by the lamps and dimmers can be improved.

Embodiments of this invention can also be used in combination with organic LED's, fluorescent lamps and any other electronic or electromechanical device such as a motor, including any variable voltage devices. One or more embodiments described herein are not necessarily limited to light sources, and advantages can be provided for low current electronic devices.

The invention claimed is:

1. A circuit for a dimmer, the circuit configured to receive an input signal from the dimmer, the circuit comprising:
   a first load; and
   a switch;
   wherein the switch is operable to automatically engage the first load when the input signal drops below a first threshold voltage and automatically disengage the first load when the input signal reaches zero.

2. The circuit of claim 1, wherein the input signal is derived from a generally sinusoidal mains supply signal.

3. The circuit of claim 1, wherein the first load is a resistive load.

4. The circuit of claim 1, wherein the dimmer is a trailing edge dimmer.

5. The circuit of claim 1, wherein the dimmer is a transistor dimmer.

6. The circuit of claim 1, wherein the first threshold voltage is adjustable in accordance with a dimming level of the dimmer.

7. A circuit for a dimmer, the circuit configured to receive an input signal from the dimmer, the circuit comprising:
   a first load; and
   a switch;
   wherein the switch is operable to automatically engage the first load at a predetermined time from a zero-crossing of the input signal and automatically disengage the first load at other times; and
   wherein the predetermined time is adjustable in accordance with a dimming level of the dimmer.

8. The circuit of claim 7, further comprising an in-rush current limiter being provided as a damper for the dimmer, wherein the in-rush current limiter has a limit level that is controllable in accordance with a dimming level of the dimmer.

9. A circuit for a dimmer, the circuit configured to receive an input signal from the dimmer, the circuit comprising:
   a first load; and
   a switch;
      wherein the switch is operable to automatically engage the first load at a predetermined time from a zero-crossing of the input signal and automatically disengage the first load at other times;
   a second load; and
   a second switch;
      wherein the second switch is operable to automatically engage the second load at a second predetermined time from a zero-crossing of the input signal, and automatically disengage the second load at other times.

10. The circuit of claim 9, wherein the second predetermined time is different from the first predetermined time.

11. The circuit of claim 9, wherein the second switch is configured to disengage the second load when the first switch engages the first load.

12. A method of operating a circuit for a dimmer, the circuit comprising a first load, the method comprising:
   receiving an input signal from a dimmer;
   automatically engaging the first load when the input signal drops below a first threshold voltage; and
   automatically disengaging the first load when the input signal reaches zero.

13. A circuit for a dimmer, the circuit configured to receive an input signal from the dimmer, the circuit comprising:
   a first load; and
   a switch;
      wherein the switch is operable to automatically engage the first load at a predetermined time from a zero-crossing of the input signal and automatically disengage the first load at other times; and
   an in-rush current limiter being provided as a damper for the dimmer, and
      wherein the in-rush current limiter has a limit level that is controllable in accordance with a dimming level of the dimmer.

* * * * *